United States Patent
Andreev et al.

(10) Patent No.: US 8,275,598 B2
(45) Date of Patent: Sep. 25, 2012

(54) SOFTWARE TABLE WALK DURING TEST VERIFICATION OF A SIMULATED DENSELY THREADED NETWORK ON A CHIP

(75) Inventors: Anatoli S. Andreev, Chassell, MI (US); Olaf K. Hendrickson, Rochester, MN (US); John M. Ludden, Essex Junction, VT (US); Richard D. Peterson, Austin, TX (US); Elena Tsanko, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 750 days.

(21) Appl. No.: 12/395,784

(22) Filed: Mar. 2, 2009

(65) Prior Publication Data

US 2010/0223505 A1 Sep. 2, 2010

(51) Int. Cl.
*G06F 17/50* (2006.01)
*G06F 9/44* (2006.01)
*G06F 13/10* (2006.01)
*G06F 9/45* (2006.01)
*G06F 9/26* (2006.01)
*G06F 9/34* (2006.01)

(52) U.S. Cl. .............. 703/21; 703/13; 703/14; 703/15; 703/16; 703/17; 703/18; 703/19; 703/20; 703/22; 711/200; 711/201; 711/202; 711/203; 711/204; 711/205; 711/206; 711/207

(58) Field of Classification Search .............. 703/13–22; 711/200–207
See application file for complete search history.

(56) References Cited

U.S. PATENT DOCUMENTS

| | | | | |
|---|---|---|---|---|
| 5,708,843 | A * | 1/1998 | Abramson et al. | 712/23 |
| 5,835,963 | A * | 11/1998 | Yoshioka et al. | 711/207 |
| 5,860,147 | A * | 1/1999 | Gochman et al. | 711/207 |
| 5,928,352 | A * | 7/1999 | Gochman et al. | 712/200 |
| 6,073,226 | A * | 6/2000 | Cutshall et al. | 711/203 |
| RE37,305 | E * | 7/2001 | Chang et al. | 711/207 |
| 6,430,657 | B1 * | 8/2002 | Mittal et al. | 711/138 |
| 6,532,553 | B1 * | 3/2003 | Rose et al. | 714/38.1 |
| 6,754,784 | B1 * | 6/2004 | North et al. | 711/145 |
| 7,185,170 | B2 * | 2/2007 | Ramaraju et al. | 711/202 |
| 7,426,626 | B2 * | 9/2008 | Augsburg et al. | 711/207 |
| 7,434,100 | B2 * | 10/2008 | Hogdal et al. | 714/27 |

OTHER PUBLICATIONS

Chen et al. "EmGen: An Automatic Test-Program Generation Tool for Embedded IP Cores", Z. Wu et al. (Eds.): ICESS 2004, LNCS 3605, pp. 528-535, 2005.*
Yourst, Matt. "PTLsim: A Cycle Accurate Full System x86-64 Microarchitectural Simulator", Jan. 2007.*
Farrens et al. "A Partitioned Translation Lookaside Buffer Approach to Reducing Address Bandwidth", 1999.*

* cited by examiner

*Primary Examiner* — Shambhavi Patel
(74) *Attorney, Agent, or Firm* — Jim Boice (57) ABSTRACT

A computer-implemented method, system and computer program product are presented for managing an Effective-to-Real Address Table (ERAT) and a Translation Lookaside Buffer (TLB) during test verification in a simulated densely threaded Network On a Chip (NOC). The ERAT and TLB are stripped out of the computer simulation before executing a test program. When the test program experiences an inevitable ERAT-miss and/or TLB-miss, an interrupt handler walks a page table until the requisite page for re-populating the ERAT and TLB is located.

20 Claims, 8 Drawing Sheets

SOFTWARE TABLE WALK DURING TEST VERIFICATION OF A SIMULATED DENSELY THREADED NETWORK ON A CHIP

TECHNICAL FIELD

The present disclosure relates to the field of computers, and specifically to test verification of computers within a simulation environment. Still more particularly, the present disclosure relates to management of addresses for data and instructions during test verification of a computer simulation.

DESCRIPTION OF THE RELATED ART

Computer systems, either real or virtual (i.e., simulated in software), include one or more processor cores, which include the logic required to execute program instructions. In order to locate and supply data (i.e., executable instructions as well as alphanumeric values such as operands) needed for a program, many processor cores utilize an Effective-to-Real Address Table (ERAT). An effective address is an address that is derived from reading a content of a memory address register, and then (typically) adding some offset value to that content to arrive at a local offset memory location. This memory location, however, is purely local, and does not directly reflect that data's actual memory address in system memory. In order to locate that data's actual memory address in system memory, the effective address is first mapped to a virtual memory address. The virtual memory address is a concatenation of the data's actual memory address with an extension, which allows the processor to use addresses that are larger than the system memory is actually capable of providing/using. A map of the virtual memory to the system memory is provided by a page table, thus allowing the program to ultimately find that data in system memory that is identified by the effective address.

A page table is typically very large. Therefore, an abbreviated version of the page table, called a Translation Lookaside Buffer (TLB) and an even smaller version called an Effective to Real Address Table (ERAT), is typically used by the processor core to increase processor performance. Thus, the ERAT maps the Effective Address (EA) to the Real Address (RA) of the required data through the use of the TLB. While the ERAT is technically just a mapping logic, the term ERAT is typically used to include logic that also retrieves, stores, and supplies data that is referenced by an EA.

Figure 1:
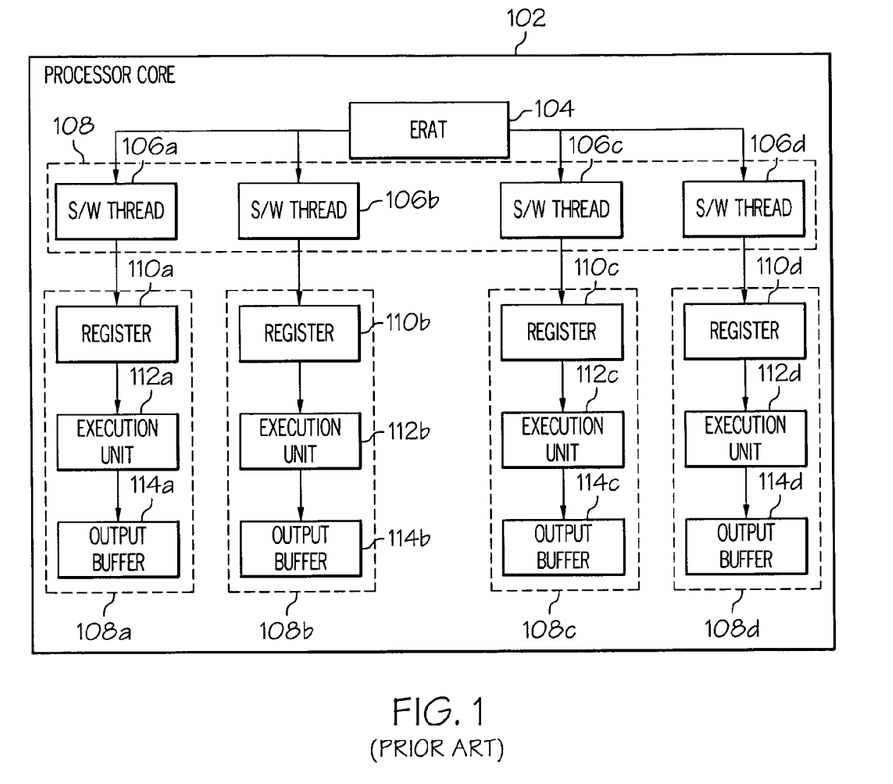
FIG. 1 depicts a prior art processor core that uses an Effective to Real Address Translation (ERAT) buffer to supply data and/or instructions to multiple software threads.

With reference now to FIG. 1, an exemplary processor core 102 (which is within a processor in a real or simulated computer—not shown) is presented. As depicted, processor core uses an ERAT 104, which is used to dispatch different software threads 106a-d (e.g., executable instructions and operand data) from a work unit 108, such as a user application and database. When the work unit 108 is received by the processor core 102, a specific hardware thread (from hardware threads 108a-d, each of which includes one of register 110a-d, execution units 112a-d, and output buffers 114a-d) may execute the instructions in one of the software threads 104a-d. The use of a single ERAT 104 by multiple software threads 106a-d causes several problems, including thrashing. Thrashing occurs when a first thread needs a particular set of data from the ERAT 104, while another thread needs another set of data that is not found in the ERAT 104.

Figure 2:
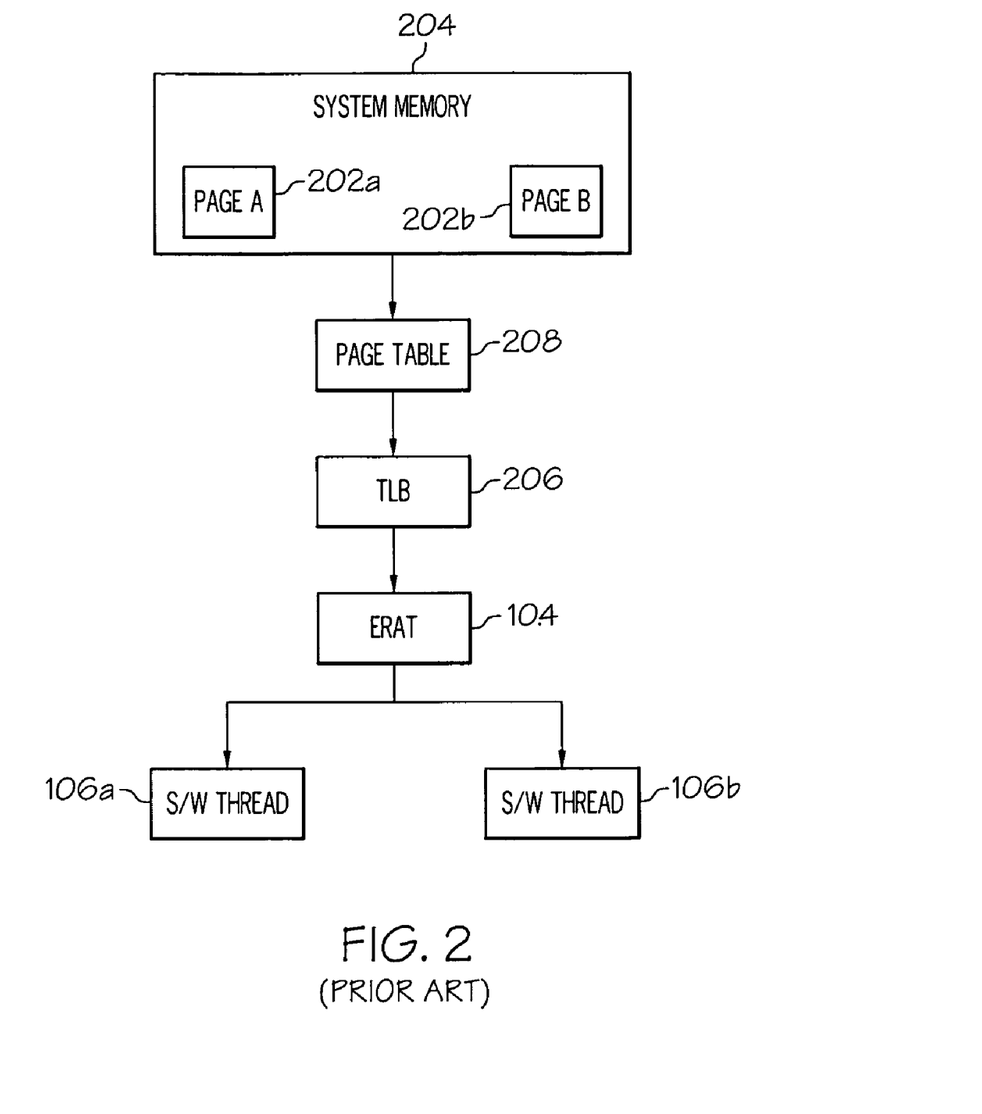
FIG. 2 illustrates a prior art problem of multiple threads thrashing pages from system memory.

To better understand thrashing, consider the exemplary scenario depicted in FIG. 2. Two software threads 106a and 106b are supplied data from ERAT 104, as shown in FIG. 1. However, assume that software thread 106a needs a page of data named "Page A" (202a) from system memory 204, while software thread 106b needs a page of data named "Page B" (202b) from system memory 204. ERAT 104 will first call on TLB 206 and page table 208 to locate and retrieve page 202a. However, before software thread 106a is able to use this data, software thread 106b instructs ERAT 104 to retrieve page 202b. ERAT 104 will therefore replace page 202a with 202b. This causes software thread 106a to re-request page 202a, causing a back-and-forth replacement ("thrashing") of the data from pages 202a-b in ERAT 104. This problem is especially prevalent in Network On a Chip (NOC) architectures, which utilize multiple processors on a single chip, all of which use a same system memory.

SUMMARY OF THE INVENTION

In order to address the issues described above, a computer-implemented method, system and computer program product are presented for managing an Effective-to-Real Address Table (ERAT) and a Translation Lookaside Buffer (TLB) during test verification in a simulated densely threaded Network On a Chip (NOC). The ERAT and TLB are stripped out of the computer simulation before executing a test program. When the test program experiences an inevitable ERAT-miss and/or TLB-miss, an interrupt handler walks a page table until the requisite page for re-populating the ERAT and TLB is located.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 3:
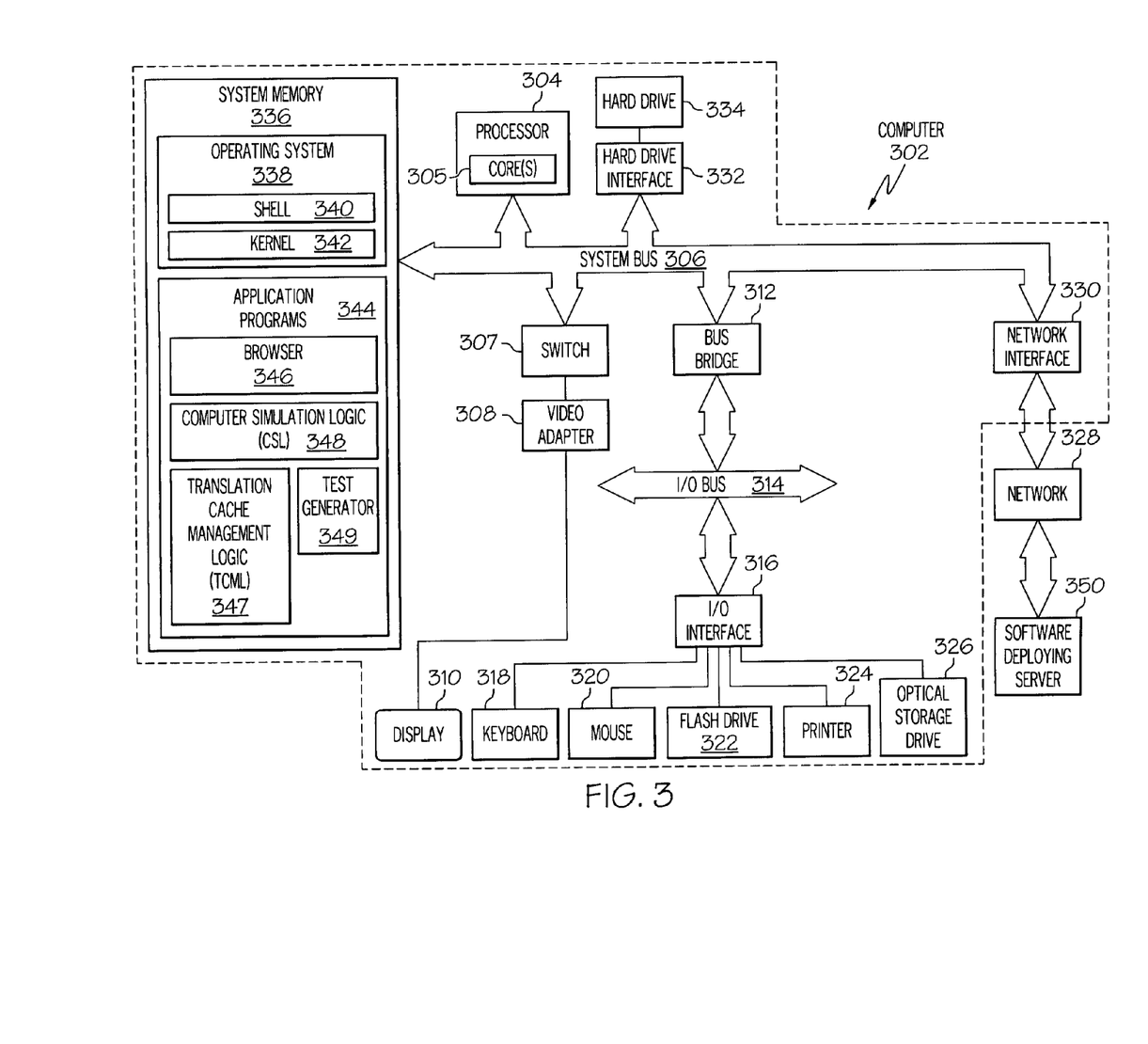
FIG. 3 depicts an exemplary embodiment of a computer that can be used when implementing the present invention.

With reference now to FIG. 3, an exemplary computer 302, which may be utilized in the simulation, testing and data management described by the present invention, is presented. Note that some or all of the exemplary architecture shown for computer 302 may be utilized by software deploying server 350.

Computer 302 includes at least one processor 304. Processor 304 may be a standard von-Neumann type of processor or a Network On a Chip (NOC), such as the NOC 402 depicted in FIG. 4. Processor 304, which may utilize one or more processors each having one or more processor cores 305, is coupled to a system bus 306. A video adapter 308, which drives/supports a display 310, is also coupled to system bus 306. In one embodiment, a switch 307 couples the video adapter 308 to the system bus 306. Alternatively, the switch 307 may couple the video adapter 308 to the display 310. In either embodiment, the switch 307 is a switch, preferably mechanical, that allows the display 310 to be coupled to the system bus 306, and thus to be functional, only upon execution of instructions that perform the method described herein. This switching causes a transformation of the computer 302 from a system in which pending steps and/or results of the herein described method, are NOT displayed into a system in which these results ARE displayed.

System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Flash Drive 322, a printer 324, and an optical storage device 326 (e.g., a CD-ROM drive). The format of the ports connected to I/O interface 316 may be any known to those skilled in the art of computer architecture, including but not limited to Universal Serial Bus (USB) ports.

Computer 302 is able to communicate with a software deploying server 350 via network 328 using a network interface 330, which is coupled to system bus 306. Network 328 may be an external network such as the Internet, or an internal network such as an Ethernet or a Virtual Private Network (VPN).

A hard drive interface 332 is also coupled to system bus 306. Hard drive interface 332 interfaces with a hard drive 334. In a preferred embodiment, hard drive 334 populates a system memory 336, which is also coupled to system bus 306. System memory is defined as a lowest level of volatile memory in computer 302. This volatile memory includes additional higher levels of volatile memory (not shown), including, but not limited to, cache memory, registers and buffers. Data that populates system memory 336 includes computer 302's operating system (OS) 338 and application programs 344.

OS 338 includes a shell 340, for providing transparent user access to resources such as application programs 344. Generally, shell 340 is a program that provides an interpreter and an interface between the user and the operating system. More specifically, shell 340 executes commands that are entered into a command line user interface or from a file. Thus, shell 340, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. Note that while shell 340 is a text-based, line-oriented user interface, the present invention will equally well support other user interface modes, such as graphical, voice, gestural, etc.

As depicted, OS 338 also includes kernel 342, which includes lower levels of functionality for OS 338, including providing essential services required by other parts of OS 338 and application programs 344, including memory management, process and task management, disk management, and mouse and keyboard management.

Application programs 344 include a renderer, shown in exemplary manner as a browser 346. Browser 346 includes program modules and instructions enabling a World Wide Web (WWW) client (i.e., computer 302) to send and receive network messages to the Internet using HyperText Transfer Protocol (HTTP) messaging, thus enabling communication with software deploying server 350 and other described computer systems.

Application programs 344 in computer 302's system memory (as well as software deploying server 350's system memory) also include a Translation Cache Management Logic (TCML) 347, a Computer Simulation Logic (CSL) 348, and a test generator 349. In a manner described in detail below, TCML 347 is software that protectively and proactively moves the contents of TLBs and ERATS to special pages in system memory before executing test instructions. CSL 348 is software that includes code for generating a software simulation of a hardware computer system, such as a Network On a Chip (NOC) 402 depicted below in FIG. 4. Test generator 349 generates random instructions and/or data to be executed within the simulated computer system that is generated by CSL 348. In one embodiment, computer 302 is able to download TCML 347, CSL 348, and/or test generator 349 from software deploying server 350, including in an on-demand basis. Note further that, in one embodiment of the present invention, software deploying server 350 performs all of the functions associated with the present invention (including execution of TCML 347, CSL 348, and/or test generator 349), thus freeing computer 302 from having to use its own internal computing resources to execute TCML 347, CSL 348, and/or test generator 349.

The hardware elements depicted in computer 302 are not intended to be exhaustive, but rather are representative to highlight essential components required by the present invention. For instance, computer 302 may include alternate memory storage devices such as magnetic cassettes, Digital Versatile Disks (DVDs), Bernoulli cartridges, and the like. These and other variations are intended to be within the spirit and scope of the present invention.

As noted above, a preferred embodiment of the present invention of managing an Effective-to-Real Address Table (ERAT) and a Translation Lookaside Buffer (TLB) during test verification utilizes a simulated version of a densely threaded Network On a Chip (NOC). A NOC is a novel integrated circuit that applies a network architecture to a single chip to create a unique processing unit. Rather than utilizing a standard single von Neumann architecture, which has a control unit that coordinates data flowing between an arithmetic logic unit and memory, and between the arithmetic logic unit and input/output buffers along system and Input/Output (I/O) buses, a NOC passes data between logic nodes (each of which may or may not utilize a von Neumann-type processor) using packets. Each packet includes a header, which addresses the logic node that is to receive and process the packet, and a payload (e.g., data, instructions, etc.).

Figure 4:
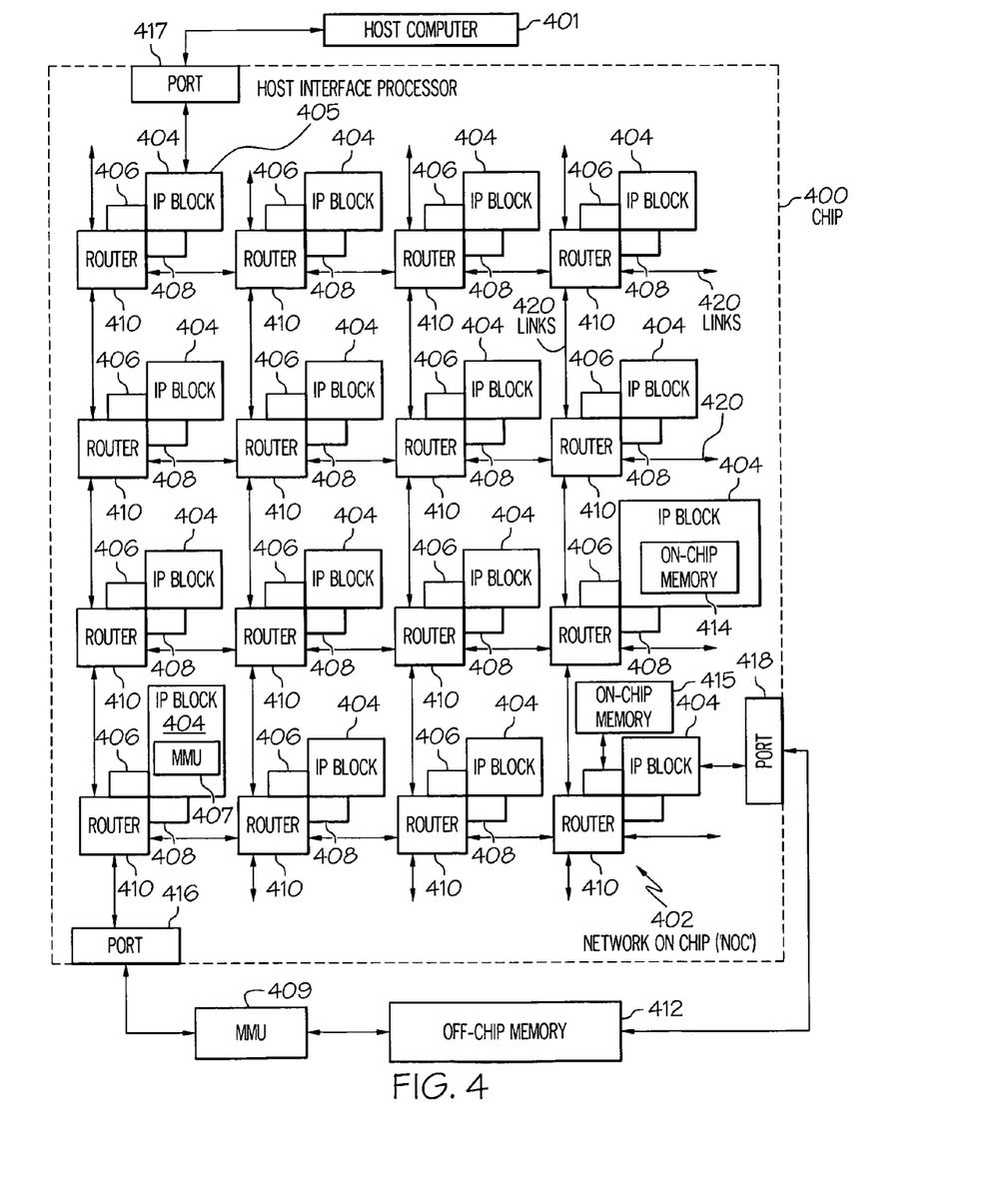
FIG. 4 illustrates an architecture of an exemplary Network On a Chip (NOC) that can be simulated for use by the present invention.

With reference now to FIG. 4, a functional block diagram is presented of an exemplary NOC 402 according to embodiments of the present invention. NOC 402 is implemented on an integrated circuit chip 400, and is controlled by a host computer 401. The NOC 402 includes Integrated Processor ("IP") blocks 404, routers 410, memory communications controllers 406, and network interface controllers 408. Each IP block 404 is adapted to a router 410 through a dedicated memory communications controller 406 and a dedicated network interface controller 408. Each memory communications controller 406 controls communications between an IP block 404 and memory (e.g., an on-chip memory 414 and/or an off-chip memory 412), and each network interface controller 408 controls inter-IP block communications through routers 410.

In NOC 402, each IP block 404 represents a reusable unit of synchronous or asynchronous logic design used as a building block for data processing within the NOC 402. The term "IP block" is sometimes referred to as an "intellectual property block," thus designating an IP block 404 as a design that is owned by a party, which is the intellectual property of a party, to be licensed to other users or designers of semiconductor circuits. In the scope of the present invention, however, there is no requirement that IP blocks be subject to any particular ownership, so the term is always expanded in this specification as "integrated processor block." Thus, IP blocks 404, as specified here, are reusable units of logic, cell, or chip layout design that may or may not be the subject of intellectual property. Furthermore, IP blocks 404 are logic cores that can be formed as Application Specific Integrated Circuit (ASIC) chip designs or Field Programmable Gate Array (FPGA) logic designs.

One way to describe IP blocks by analogy is that IP blocks are for NOC design what a library is for computer programming or a discrete integrated circuit component is for printed circuit board design. In NOCs according to embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHSIC Hardware Description Language (VHDL). In addition to netlist and synthesizable implementation, NOCs may also be delivered in lower-level, physical descriptions. Analog IP block elements such as a Serializer/Deserializer (SERDES), Phase-Locked Loop (PLL), Digital-to-Analog Converter (DAC), Analog-to-Digital Converter (ADC), and so on, may be distributed in a transistor-layout format such as Graphic Data System II (GDSII). Digital elements of IP blocks are sometimes offered in layout format as well.

Each IP block 404 shown in FIG. 4 is adapted to a router 410 through a memory communications controller 406. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 406 are described in more detail below in FIG. 5.

Each IP block 404 depicted in FIG. 4 is also adapted to a router 410 through a network interface controller 408. Each network interface controller 408 controls communications through routers 410 between IP blocks 404. Examples of communications between IP blocks include messages (e.g., message/data packets) carrying data and instructions for processing the data among IP blocks in parallel applications and in pipelined applications. The network interface controllers 408 are described in more detail below in FIG. 5.

The routers 410 and links 420 among the routers implement the network operations of the NOC 402 shown in FIG. 4. The links 420 are packet structures implemented on physical, parallel wire buses connecting all the routers. That is, each link is implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, thus requiring 512 wires. In addition, each link 420 is bi-directional, so that if the link packet structure includes 64 bytes, the wire bus actually contains 1024 wires between each router 410 and each of its neighbor routers 410 in the network. A message can include more than one packet, but each packet fits precisely onto the width of the wire bus. If the connection between the router and each section of wire bus is referred to as a port, then each router includes five ports, one for each of four directions of data transmission on the network and a fifth port for adapting the router to a particular IP block through a memory communications controller and a network interface controller.

As stated above, each memory communications controller 406 controls communications between an IP block and memory. Memory can include off-chip main RAM 412, an on-chip memory 415 that is connected directly to an IP block through a memory communications controller 406, on-chip memory enabled as an IP block 414, and on-chip caches. In the NOC 402 shown in FIG. 4, either of the on-chip memories (414, 415), for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. On-chip memory 414 on an IP block can be addressed from that IP block or from any other IP block in the NOC. On-chip memory 415 is attached directly to a memory communication controller, and can be addressed by the IP block that is adapted to the network by that memory communication controller. Note that on-chip memory 415 can also be addressed from any other IP block 404 anywhere in the NOC 402.

Exemplary NOC 402 includes two Memory Management Units ("MMUs") 407 and 409, illustrating two alternative memory architectures for NOCs according to embodiments of the present invention. MMU 407 is implemented with a specific IP block 404, allowing a processor within that IP block 404 to operate in virtual memory while allowing the entire remaining architecture of the NOC 402 to operate in a physical memory address space. The MMU 409 is implemented off-chip, connected to the NOC through a data communications port referenced as port 416. Port 416 includes the pins and other interconnections required to conduct signals between the NOC 402 and the MMU 409, as well as sufficient intelligence to convert message packets from the NOC packet format to the bus format required by the external MMU 409. The external location of the MMU 409 means that all processors in all IP blocks 404 of the NOC 402 can operate in virtual memory address space, with all conversions to physical addresses of the off-chip memory handled by the off-chip MMU 409.

In addition to the two memory architectures illustrated by use of the MMUs 407 and 409, the data communications port depicted as port 418 illustrates a third memory architecture useful in NOCs according to embodiments of the present invention. Port 418 provides a direct connection between an IP block 404 of the NOC 402 and off-chip memory 412. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 418. The port 418 includes the pins and other interconnections required to conduct signals between the NOC and the off-chip memory 412, as well as sufficient intelligence to convert message packets from the NOC packet format to the bus format required by the off-chip memory 412.

In the exemplary NOC 402 shown in FIG. 4, one of the IP blocks 404 is designated a host interface processor 405. A host interface processor 405 provides an interface between the NOC 402 and a host computer 401. Host interface processor 405 provides data processing services to the other IP blocks on the NOC, including, for example, receiving and dispatching among the IP blocks of the NOC data processing requests from the host computer.

Host interface processor 405 is connected to the larger host computer 401 through a data communications port such as port 417. Port 417 includes the pins and other interconnections required to conduct signals between the NOC 402 and the host computer 401, as well as sufficient intelligence to convert message packets from the NOC 402 to the bus format required by the host computer 401.

Note that each group of elements 404, 406, 408, and 410 can be viewed and referenced as a node 422 within the NOC 402.

Figure 5:
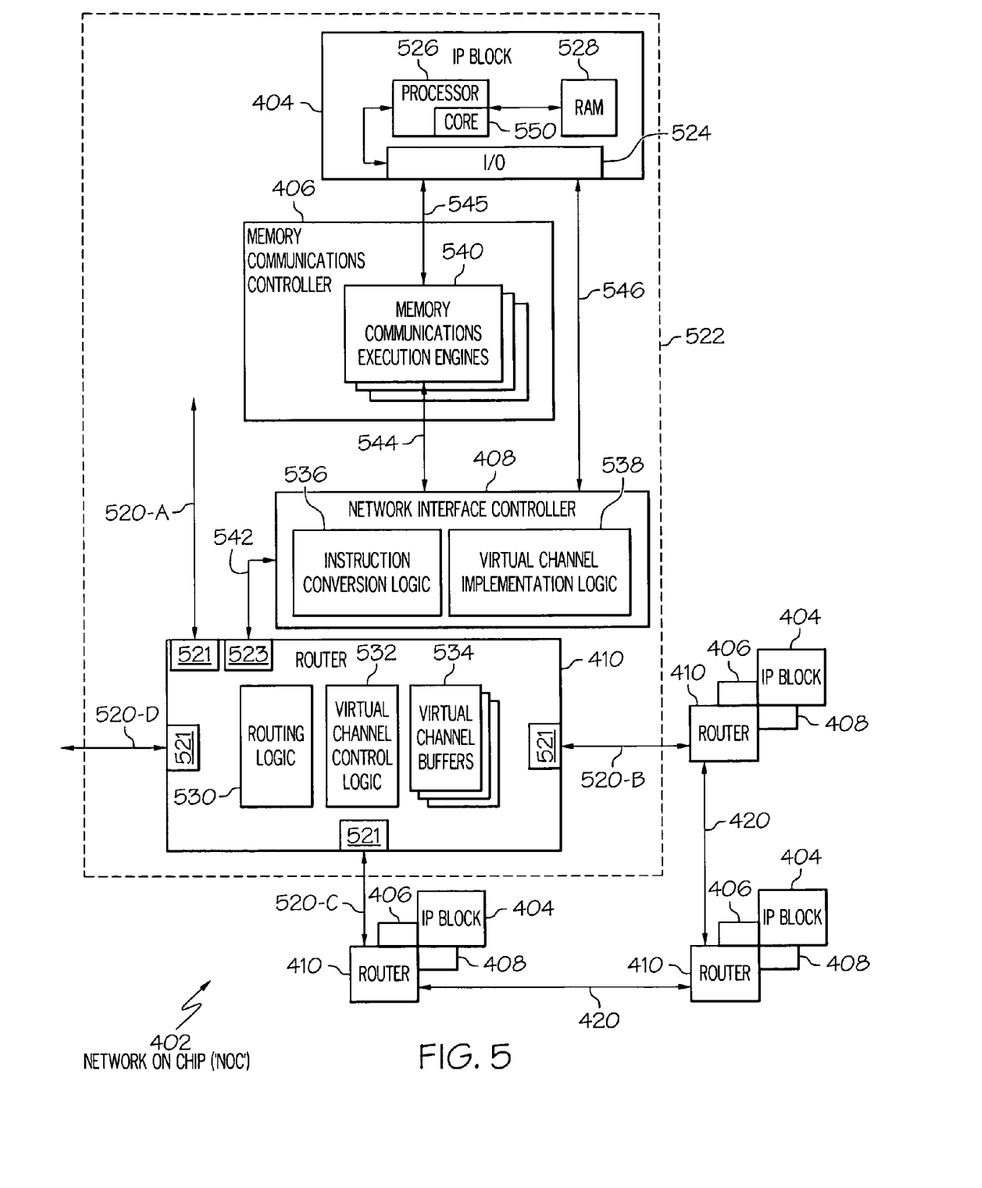
FIG. 5 depicts additional detail of a processor node from the NOC shown in FIG. 4.

Referring now to FIG. 5, additional detail of NOC 402 is presented according to embodiments of the present invention. As depicted in FIG. 4 and FIG. 5, NOC 402 is implemented on a chip (e.g., chip 400 shown in FIG. 4), and includes integrated processor ("IP") blocks 404, routers 410, memory communications controllers 406, and network interface controllers 408. Each IP block 404 is adapted to a router 410 through a memory communications controller 406 and a network interface controller 408. Each memory communications controller 406 controls communications between an IP block and memory, and each network interface controller 408 controls inter-IP block communications through routers 410. In the example of FIG. 5, one set 522 of an IP block 404 adapted to a router 410 through a memory communications controller 406 and network interface controller 408 is expanded to aid a more detailed explanation of their structure and operations. All the IP blocks, memory communications controllers, network interface controllers, and routers in the example of FIG. 5 are configured in the same manner as the expanded set 522.

In the example of FIG. 5, each IP block 404 includes a computer processor 526, which includes one or more cores 550, and I/O functionality 524. In this example, computer memory is represented by a segment of Random Access Memory ("RAM") 528 in each IP block 404. The memory, as described above with reference to the example of FIG. 4, can occupy segments of a physical address space whose contents on each IP block are addressable and accessible from any IP block in the NOC. The processors 526, I/O capabilities 524, and memory (RAM 528) on each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In the NOC 402 shown in FIG. 5, each memory communications controller 406 includes a plurality of memory communications execution engines 540. Each memory communications execution engine 540 is enabled to execute memory communications instructions from an IP block 404, including bidirectional memory communications instruction flow (544, 545, 546) between the network interface controller 408 and the IP block 404. The memory communications instructions executed by the memory communications controller may originate, not only from the IP block adapted to a router through a particular memory communications controller, but also from any IP block 404 anywhere in the NOC 402. That is, any IP block 404 in the NOC 402 can generate a memory communications instruction and transmit that memory communications instruction through the routers 410 of the NOC 402 to another memory communications controller associated with another IP block for execution of that memory communications instruction. Such memory communications instructions can include, for example, translation lookaside buffer control instructions, cache control instructions, barrier instructions, and memory load and store instructions.

Each of the depicted memory communications execution engines 540 is enabled to execute a complete memory communications instruction separately and in parallel with other memory communications execution engines 540. The memory communications execution engines 540 implement a scalable memory transaction processor optimized for concurrent throughput of memory communications instructions. The memory communications controller 406 supports multiple memory communications execution engines 540, all of which run concurrently for simultaneous execution of multiple memory communications instructions. A new memory communications instruction is allocated by the memory communications controller 406 to each memory communications execution engine 540, and the memory communications execution engines 540 can accept multiple response events simultaneously. In this example, all of the memory communications execution engines 540 are identical. Scaling the number of memory communications instructions that can be handled simultaneously by a memory communications controller 406, therefore, is implemented by scaling the number of memory communications execution engines 540.

In the NOC 402 depicted in FIG. 5, each network interface controller 408 is enabled to convert communications instructions from command format to network packet format for transmission among the IP blocks 404 through routers 410. The communications instructions are formulated in command format by the IP block 410 or by the memory communications controller 406 and provided to the network interface controller 408 in command format. The command format is a native format that conforms to architectural register files of the IP block 404 and the memory communications controller 406. The network packet format is the format required for transmission through routers 410 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In the NOC 402 shown in FIG. 5, each IP block 404 is enabled to send memory-address-based communications to and from memory through the IP block's memory communications controller and then also through its network interface controller to the network. A memory-address-based communications is a memory access instruction, such as a load instruction or a store instruction, which is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. All memory-address-based communications that are executed with message traffic are passed from the memory communications controller to an associated network interface controller for conversion (using instruction conversion logic 536) from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 406 is naturally also the network location of that memory communication controller's associated router 410, network interface controller 408, and IP block 404. The instruction conversion logic 536 within each network interface controller is capable of converting memory addresses to network addresses for purposes of transmitting memory-address-based communications through routers of a NOC.

Upon receiving message traffic from routers 410 of the network, each network interface controller 408 inspects each packet for memory instructions. Each packet containing a memory instruction is handed to the memory communications controller 406 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

Returning now to the NOC 402 as depicted in FIG. 5, each IP block 404 is enabled to bypass its memory communications controller 406 and send inter-IP block, network-addressed communications 546 directly to the network through the IP block's network interface controller 408. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through its I/O functions 524 directly to the IP block's network interface controller in command format, then converted to packet format by the network interface controller and transmitted through routers of the NOC to another IP block. Such network-addressed communications 546 are bi-directional, potentially proceeding to and from each IP block of the NOC, depending on their use in any particular application. Each network interface controller, however, is enabled to both send and receive (communication 542) such communications to and from an associated router, and each network interface controller is enabled to both send and receive (communication 546) such communications directly to and from an associated IP block, bypassing an associated memory communications controller 406.

Each network interface controller 408 in the example of FIG. 5 is also enabled to implement virtual channels on the network, characterizing network packets by type. Each network interface controller 408 includes virtual channel implementation logic 538 that classifies each communication instruction by type and records the type of instruction in a field of the network packet format before handing off the instruction in packet form to a router 410 for transmission on the NOC. Examples of communication instruction types include inter-IP block network-address-based messages, request messages, responses to request messages, invalidate messages directed to caches; memory load and store messages; and responses to memory load messages, and so on.

Each router 410 in the example of FIG. 5 includes routing logic 530, virtual channel control logic 532, and virtual channel buffers 534. The routing logic typically is implemented as a network of synchronous and asynchronous logic that implements a data communications protocol stack for data communication in the network formed by the routers 410, links 420, and bus wires among the routers. The routing logic 530 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed. Each router in this example includes five ports, four ports 521 connected through bus wires (520-A, 520-B, 520-C, 520-D) to other routers and a fifth port 523 connecting each router to its associated IP block 404 through a network interface controller 408 and a memory communications controller 406.

In describing memory-address-based communications above, each memory address was described as mapped by network interface controllers to a network address, a network location of a memory communications controller. The network location of a memory communication controller 406 is naturally also the network location of that memory communication controller's associated router 410, network interface controller 408, and IP block 404. In inter-IP block, or network-address-based communications, therefore, it is also typical for application-level data processing to view network addresses as the locations of IP blocks within the network formed by the routers, links, and bus wires of the NOC. Note that FIG. 4 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In the NOC 402 depicted in FIG. 5, each router 410 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 410 depicted in FIG. 5 also includes virtual channel control logic 532 and virtual channel buffers 534. The virtual channel control logic 532 examines each received packet for its assigned communications type and places each packet in an outgoing virtual channel buffer for that communications type for transmission through a port to a neighboring router on the NOC.

Each virtual channel buffer 534 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 534 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 408. Each network interface controller is configured to, upon receipt of such a signal, refuse to accept, from its associated memory communications controller 406 or from its associated IP block 404, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped in the architecture of FIG. 5. When a router encounters a situation in which a packet might be dropped in some unreliable protocol such as, for example, the Internet Protocol, the routers in the example of FIG. 5 suspend by their virtual channel buffers 534 and their virtual channel control logic 532 all transmissions of packets in a virtual channel until buffer space is again available, eliminating any need to drop packets. The NOC 402, as depicted in FIG. 5, therefore, implements highly reliable network communications protocols with an extremely thin layer of hardware.

Figure 6:
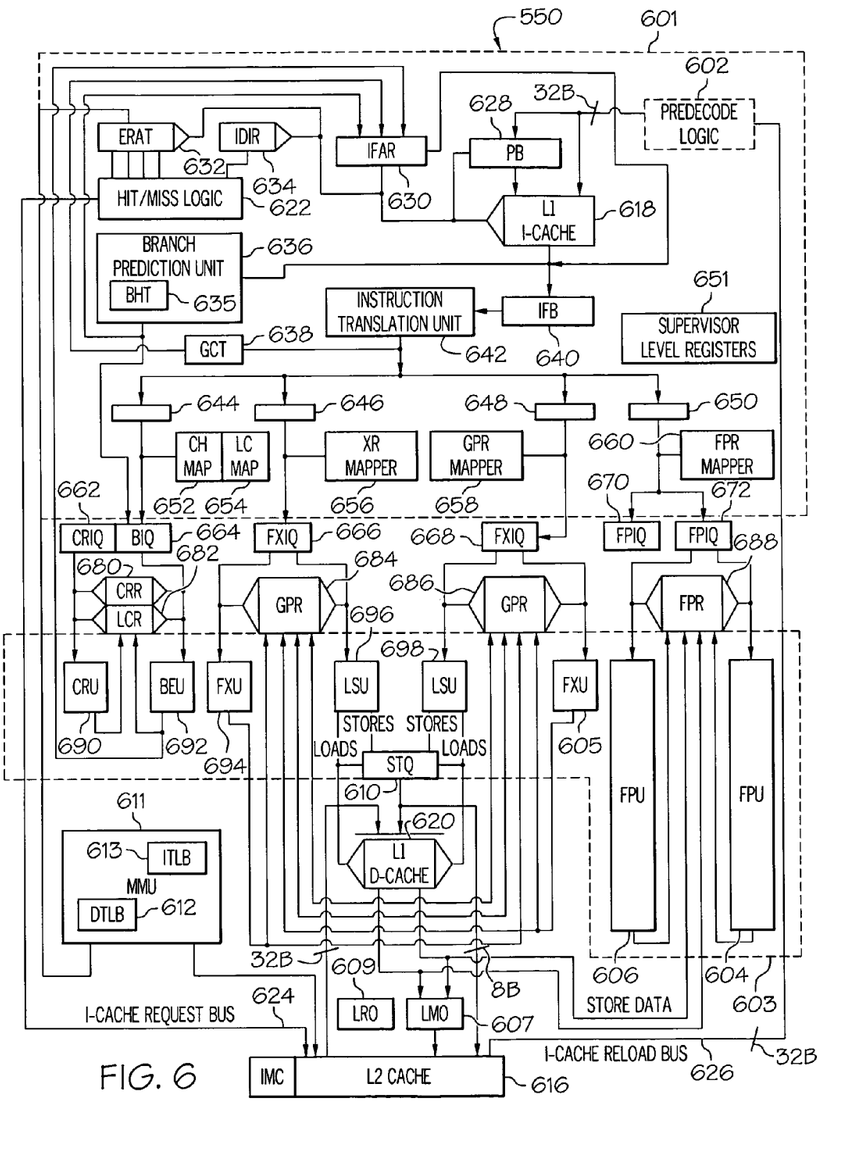
FIG. 6 illustrates additional detail of a processor core found in the processor node shown in FIG. 5.

Referring now to FIG. 6, additional exemplary detail of core 550, originally presented in FIG. 5, is presented. Core 550 includes an on-chip multi-level cache hierarchy including a unified level two (L2) cache 616 and bifurcated level one (L1) instruction (I) and data (D) caches 618 and 620, respectively. As is well-known to those skilled in the art, caches 616, 618, and 620 provide low latency access to cache lines corresponding to memory locations in system memory (e.g., Random Access Memory—RAM).

Instructions are fetched for processing from L1 I-cache 618 in response to the effective address (EA) residing in instruction fetch address register (IFAR) 630. During each cycle, a new instruction fetch address may be loaded into IFAR 630 from one of three sources: branch prediction unit (BPU) 636, which provides speculative target path and sequential addresses resulting from the prediction of conditional branch instructions, global completion table (GCT) 638, which provides flush and interrupt addresses, and branch execution unit (BEU) 692, which provides non-speculative addresses resulting from the resolution of predicted conditional branch instructions. Associated with BPU 636 is a branch history table (BHT) 635, in which are recorded the resolutions of conditional branch instructions to aid in the prediction of future branch instructions.

An effective address (EA), such as the instruction fetch address within IFAR 630, is the address of data or an instruction generated by a processor. To access data (including instructions) in memory, the EA is converted to a real address (RA), through one or more levels of translation, associated with the physical location where the data or instructions are stored.

Within core 550, effective-to-real address translation is performed by memory management units (MMUs) and associated address translation facilities. Preferably, a separate MMU is provided for instruction accesses and data accesses. In FIG. 6, a single MMU 611 is illustrated, for purposes of clarity, showing connections only to Instruction Store Unit (ISU) 601. However, it is understood by those skilled in the art that MMU 611 also preferably includes connections (not shown) to load/store units (LSUs) 696 and 698 and other components necessary for managing memory accesses. MMU 611 includes an Instruction Translation Lookaside Buffer (ITLB) 613 and a Data Translation Lookaside Buffer (DTLB) 612, which are depicted as separate entities, but are preferably a unified data and instruction Translation Lookaside Buffer (unified TLB 612/613) that is made up of 612 and 613. Each TLB contains recently referenced page table entries, which are accessed to translate EAs to RAs for data or instructions (from unified TLB 612/613). Recently referenced EA-to-RA translations from TLB 613 are cached in an effective-to-real address table (ERAT) 632, which may be a data ERAT and/or an instruction ERAT.

If hit/miss logic 622 determines, after translation of the EA contained in IFAR 630 by ERAT 632 and lookup of the real address (RA) in I-cache directory 634, that the cache line of instructions corresponding to the EA in IFAR 630 does not reside in L1 I-cache 618, then hit/miss logic 622 provides the RA to L2 cache 616 as a request address via I-cache request bus 624. Such request addresses may also be generated by prefetch logic within L2 cache 616 based upon recent access patterns. In response to a request address, L2 cache 616 outputs a cache line of instructions, which are loaded into prefetch buffer (PB) 628 and L1 I-cache 618 via I-cache reload bus 626, possibly after passing through optional predecode logic 602.

Once the cache line specified by the EA in IFAR 630 resides in L1 cache 618, L1 I-cache 618 outputs the cache line to both branch prediction unit (BPU) 636 and to instruction fetch buffer (IFB) 640. BPU 636 scans the cache line of instructions for branch instructions and predicts the outcome of conditional branch instructions, if any. Following a branch prediction, BPU 636 furnishes a speculative instruction fetch address to IFAR 630, as discussed above, and passes the prediction to branch instruction queue 664 so that the accuracy of the prediction can be determined when the conditional branch instruction is subsequently resolved by branch execution unit 692.

IFB 640 temporarily buffers the cache line of instructions received from L1 I-cache 618 until the cache line of instructions can be translated by instruction translation unit (ITU) 642. In the illustrated embodiment of core 550, ITU 642 translates instructions from user instruction set architecture (UISA) instructions into a possibly different number of internal ISA (IISA) instructions that are directly executable by the execution units of core 550. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 638 to an instruction group, the members of which are permitted to be dispatched and executed out-of-order with respect to one another. Global completion table 638 tracks each instruction group for which execution has yet to be completed by at least one associated EA, which is preferably the EA of the oldest instruction in the instruction group.

Following UISA-to-IISA instruction translation, instructions are dispatched to one of latches 644, 646, 648, and 650, possibly out-of-order, based upon instruction type. That is, branch instructions and other condition register (CR) modifying instructions are dispatched to latch 644, fixed-point and load-store instructions are dispatched to either of latches 646 and 648, and floating-point instructions are dispatched to latch 650. Each instruction requiring a rename register for temporarily storing execution results is then assigned one or more rename registers by the appropriate one of CR mapper 652, link and count (LC) register mapper 654, exception register (XER) mapper 656, general-purpose register (GPR) mapper 658, and floating-point register (FPR) mapper 660.

The dispatched instructions are then temporarily placed in an appropriate one of CR issue queue (CRIQ) 662, branch issue queue (BIQ) 664, fixed-point issue queues (FXIQs) 666 and 668, and floating-point issue queues (FPIQs) 670 and 672. From issue queues 662, 664, 666, 668, 670, and 672, instructions can be issued opportunistically to the execution units of processing unit 603 for execution as long as data dependencies and antidependencies are observed. The instructions, however, are maintained in issue queues 662-672 until execution of the instructions is complete and the result data, if any, are written back, in case any of the instructions need to be reissued.

As illustrated, the execution units of core 550 include a CR unit (CRU) 690 for executing CR-modifying instructions, a branch execution unit (BEU) 692 for executing branch instructions, two fixed-point units (FXUs) 694 and 605 for executing fixed-point instructions, two load-store units (LSUs) 696 and 698 for executing load and store instructions, and two floating-point units (FPUs) 606 and 604 for executing floating-point instructions. Each of execution units 690-604 is preferably implemented as an execution pipeline having a number of pipeline stages.

During execution within one of execution units 690-604, an instruction receives operands, if any, from one or more architected and/or rename registers within a register file coupled to the execution unit. When executing CR-modifying or CR-dependent instructions, CRU 690 and BEU 692 access the CR register file 680, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) file 682 contains a count register (CTR), a link register (LR) and rename registers of each, by which BEU 692 may also resolve conditional branches to obtain a path address. General-purpose register files (GPRs) 684 and 686, which are synchronized, duplicate register files and store fixed-point and integer values accessed and produced by FXUs 694 and 605 and LSUs 696 and 698. Floating-point register file (FPR) 688, which like GPRs 684 and 686 may also be implemented as duplicate sets of synchronized registers, contains floating-point values that result from the execution of floating-point instructions by FPUs 606 and 604 and floating-point load instructions by LSUs 696 and 698.

After an execution unit finishes execution of an instruction, the execution notifies GCT 638, which schedules completion of instructions in program order. To complete an instruction executed by one of CRU 690, FXUs 694 and 605 or FPUs 606 and 604, GCT 638 signals the execution unit, which writes back the result data, if any, from the assigned rename register (s) to one or more architected registers within the appropriate register file. The instruction is then removed from the issue queue, and once all instructions within its instruction group have been completed, is removed from GCT 638. Other types of instructions, however, are completed differently.

When BEU 692 resolves a conditional branch instruction and determines the path address of the execution path that should be taken, the path address is compared against the speculative path address predicted by BPU 636. If the path addresses match, no further processing is required. If, however, the calculated path address does not match the predicted path address, BEU 692 supplies the correct path address to IFAR 630. In either event, the branch instruction can then be removed from BIQ 664, and when all other instructions within the same instruction group have completed executing, from GCT 638.

Following execution of a load instruction, the effective address computed by executing the load instruction is translated to a real address by a data ERAT (not illustrated) and then provided to L1 D-cache 620 as a request address. At this point, the load instruction is removed from FXIQ 666 or 668 and placed in load reorder queue (LRQ) 609 until the indicated load is performed. If the request address misses in L1 D-cache 620, the request address is placed in load miss queue (LMQ) 607, from which the requested data is retrieved from L2 cache 616, and failing that, from another core 550 or from system memory (e.g., RAM 528 shown in FIG. 5). LRQ 609 snoops exclusive access requests (e.g., read-with-intent-to-modify), flushes or kills on interconnect fabric (not shown) against loads in flight, and if a hit occurs, cancels and reissues the load instruction. Store instructions are similarly completed utilizing a store queue (STQ) 610 into which effective addresses for stores are loaded following execution of the store instructions. From STQ 610, data can be stored into either or both of L1 D-cache 620 and L2 cache 616.

Figure 7:
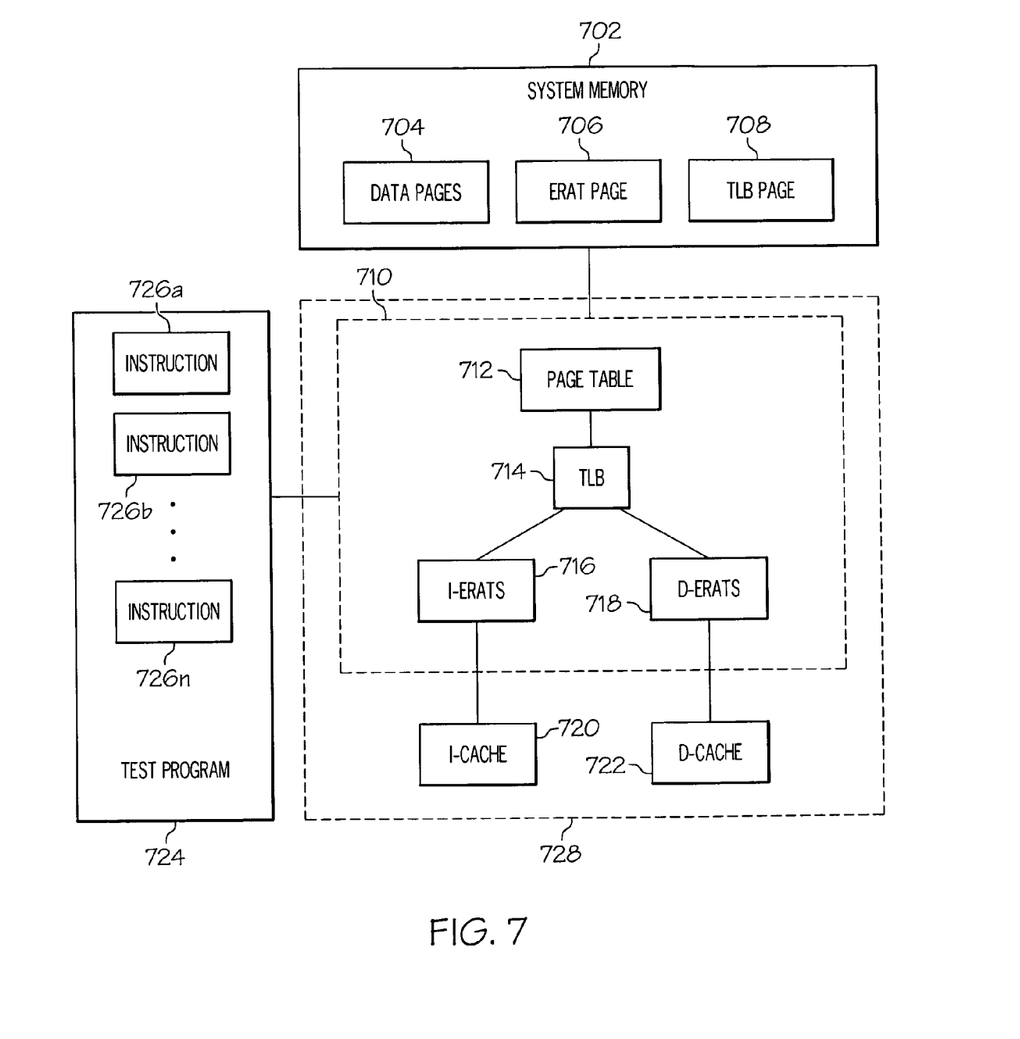
FIG. 7 depicts ERAT pages and TLB pages that preemptively store the contents of the ERAT and TLB in a translation cache before executing instructions.

Before discussing FIG. 7, it should be understood that a page of memory is a fixed-length block of system memory, which is utilized both in real addressing modes and virtual addressing modes. Similarly, a page of memory is a smallest block of data (both alphanumeric data such as operands as well as instructions) that can be moved back and forth into secondary memory, such as a hard drive. Thus, as depicted in FIG. 7, a system memory 702 contains data pages 704, which include ordinary alphanumeric and instruction entries. In addition, for purposes of novelty described below, system memory 702 may also have dedicated pages (reserved blocks of system memory) defined as one or more ERAT page 706 and one or more TLB page 708.

Continuing with FIG. 7, a translation cache 710 includes a page table 712, a TLB 714, and multiple I-ERATS 716 and D-ERATS 718 that could be used to provide data to an I-cache 720 and a D-cache 722. That is, there may be up to 16 I-ERATS 716 and 32 D-ERATS 718 that utilize a same TLB 714. The present invention does not need the page table 712, however, since the contents of the TLB 714 and/or ERATS 716 and 718 can be pulled directly from the ERAT/TLB pages 706 and 708.

Assume now, for explanatory and exemplary purposes, that a test program (used to test a real or simulated piece of hardware) has multiple instructions 726a-n, where "n" is an integer. Assume also that instruction 726a is to be executed first. Instruction 726a thus requires a translation cache 710 to provide needed instructions (the actual instruction itself as well as any sub-instructions and/or support instructions) and data (operand(s) needed by the actual instruction) respectively to an I-cache 720 and a D-Cache 722 within a processor core 728. The I-cache 720 and the D-cache 722 will not have the requisite instructions/data during this initial instruction execution. However, rather than run through the I-ERATS 716, D-ERATS 718, TLB 714 and page table 712 in a traditional manner (as described above in FIG. 2 where the ERATS hit the TLB, which hits the TLB, which hits the page table, which hits system memory), the I-ERATs 716, D-ERATS 718 and/or TLB 714 are directly populated by a respective ERAT page 706 and TLB page 708 located in the system memory 702. The I-cache 720 and D-cache 722 are then populated by content in the I-ERATS 716 and D-ERATS 718. When instruction 726b is to be executed, the translation cache 710 is partially populated, and can now be further populated with instructions and data from ERAT page 706 and TLB page 708, thus providing requisite instructions/data to the I-cache 720 and D-cache 722 for use by instruction 726b. Note that the entries in the ERAT page 706 and TLB page 708 are labeled for use by particular instructions (from instructions 726a-n), and thus consistency is maintained to ensure that the contents of the I-ERATs 716, D-ERATS 718 and/or TLB 714 are specific for particular instructions.

Figure 8:
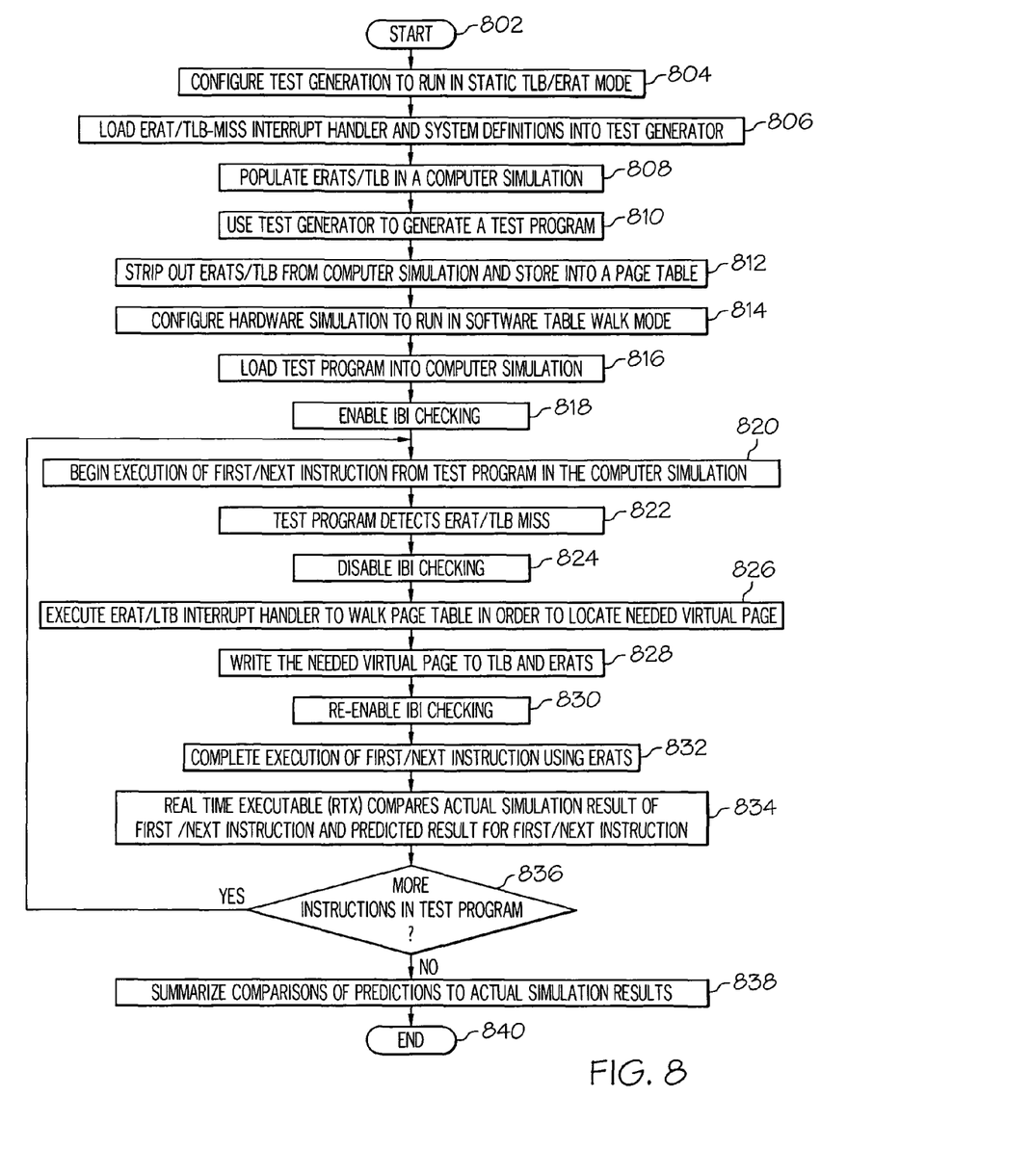
FIG. 8 is a high level flow chart of exemplary steps taken by the present invention to manage an Effective-to-Real Address Table (ERAT) and a Translation Lookaside Buffer (TLB) during test verification in a simulated densely threaded Network On a Chip (NOC).

With reference now to FIG. 8, a high level flow-chart of exemplary steps taken to manage contents of ERATS and/or TLBS during testing is presented. After initiator block 802, which may be prompted by a loading of a hardware simulation program (e.g., CSL 348 shown in FIG. 3) and/or a test program (created by, e.g., the test generator 349 shown in FIG. 3), a test program is generated to run in a static TLB/ERAT mode (block 804). This static TLB/ERAT mode ensures that contents of the TLB/ERAT remain static (fixed), in order to facilitate the steps described below. As depicted in block 806, an ERAT/TLB-miss interrupt handler (part of the TCML 347 shown in FIG. 3), along with system definitions for the simulated hardware and/or test program, are loaded into the test generator (block 806). This ERAT/TLB-miss interrupt handler will process an interrupt whenever an I-cache and/or D-cache is unable to load requisite instructions/data from an ERAT/TLB complex. As described above, this will occur whenever the contents of a translation buffer have been stripped out, which occurs in order to control and maintain the integrity of the translation buffer. Initially, however, the ERAT/TLB in the computer simulation can be populated with instructions/data from the ERAT/TLB pages (e.g., 706 and 708 shown in FIG. 7), as described in block 808.

A test generator (e.g., test generator 349 shown in FIG. 3) then generates test instructions (e.g., random instructions) to be executed in the computer simulation (e.g., a software simulated version of a computer, such as a NOC), as described in block 810. Before executing the first instruction from the test program, all content from the ERATS and TLB in the translation cache is stripped out and stored in their respective ERAT/TLB tables in system memory (block 812). The hardware simulation is configured to run in a software table walk mode (block 814), in order to enable it to walk through these ERAT/TLB pages. The test program is loaded into the computer simulation (block 816), and Instruction-By-Instruction (IBI) checking is enabled (block 818). This IBI checking allows the test program to monitor the results (output, register changes, buffer changes, timing changes, errors, etc.) of execution of each instruction in the test program.

Execution of the first instruction begins (block 820), which results in an ERAT/TLB miss (block 822), since the contents of the ERATS/TLB have been stripped out, causing the I-cache and D-cache to fail to be populated. The IBI checking is then disabled (block 824), since such IBI checking would likely change/populate the contents of the translation buffer.

The ERAT/TLB miss triggers the ERAT/TLB interrupt handler to walk the page tables (specifically the ERAT table and the TLB table) to locate the needed location in real memory needed to populate a needed virtual page for the translation buffer (block 826). This virtual page is then written to the TLB in the translation buffer, thus enabling the ERATS and ultimately populating the I-cache and D-cache (block 828).

The IBI checking is then re-enabled (block 830). Note that while such IBI checking may change the content of the translation buffer, this does not matter, since the static content of the translation buffer is always stored within the ERAT/TLB pages. The first instruction completes execution (block 832), while the IBI checking monitors for any errors/changes/etc. A real time executable (RTX) can then compare the results of execution of the first instruction with predicted results that have been created earlier (block 834).

The process then continues in an iterative manner until all instructions in the test program have been executed (query block 836 and blocks 820-834). That is, each new instruction runs and may cause a software table walk to locate the requisite instructions/data. Once all instructions have been executed, a summarization of predicted versus actual simulation results is performed in order to give an overall evaluation of how the computer simulation performed (block 838). The process ends at terminator block 840.

In one embodiment, the method described herein may be implemented by specially designed hardware that does not execute programmable instructions, but rather is hardwired to perform the logic described herein. Examples of such specially designed hardware includes Application Specific Integrated Circuits (ASICs), customized ICs, and other hardware circuitry. Use of such hardware, while technically feasible, is cumbersome. Thus, in a preferred embodiment, the methods described herein are performed by a specific computer, such as computer 302 depicted in FIG. 3, executing computer instructions that are stored on a computer-readable medium. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), etc. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent. Note also that the results of the methodology described herein may be displayed on a monitor (e.g., display 310 shown in FIG. 3). In one embodiment, the computer 302 is transformed in response to software executing the steps described in the method herein. This transformation may occur by a video adapter (e.g., video adapter 308 shown in FIG. 3) transitioning from an inactive-to-an-active state in response to the computer instructions (e.g., TCML 347 shown in FIG. 3) being executed to perform the method steps shown in FIG. 8.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, when is then applied to a VHDL chip, such as a FPGA. Applying the VHDL instructions to the VHDL chip not only causes a physical transformation of the VHDL chip, but such VHDL instruction application can also cause a specifically loaded VHDL chip to be newly coupled (physically and/or logically) to other hardware within a computer system, thus causing a additional physical transformation of the computer system.

Having thus described the invention of the present application in detail and by reference to illustrative embodiments thereof, it will be apparent that modifications and variations are possible without departing from the scope of the invention defined in the appended claims.

What is claimed is:

1. A computer-implemented method of performing a software table walk during test verification in a computer simulation, the computer-implemented method comprising utilizing a specific hardware system that performs the steps of:

loading a Translation Lookaside Buffer (TLB) interrupt handler into a test generator, wherein the test generator randomly generates instructions for a test program to be virtually executed within a computer simulation;

populating the computer simulation with at least one Translation Lookaside Buffer (TLB), wherein the TLB contains a sub-set of entries from a page table, wherein entries from the page table map a virtual address to a real address in the computer simulation, and wherein the virtual address is for data used by an instruction from the test program;

utilizing the test generator to generate the test program;

stripping said at least one TLB from the computer simulation;

executing a first instruction from the test program in the computer simulation;

in response to the test program detecting a TLB miss of a needed virtual page that is required to execute the first instruction, utilizing the TLB interrupt handler to walk the page table until the needed virtual page is located;

writing the needed virtual page to the TLB; and completing execution of the first instruction by using the needed virtual page from the TLB.

2. The computer-implemented method of claim 1, further comprising:

enabling Instruction-By-Instruction (IBI) checking before executing the first instruction from the test program, wherein the IBI checking checks for any error immediately after an instruction is executed in the computer simulation; and in response to the test program detecting the TLB miss, disabling the IBI checking before walking the page table.

3. The computer-implemented method of claim 1, further comprising:

executing a comparison instruction in the computer simulation to compare an actual simulation result from executing the first instruction to a predicted result from executing the first instruction.

4. The computer-implemented method of claim 1, further comprising:

repopulating the computer simulation with the TLB; and populating the computer simulation with at least one Effective to Real Address Table (ERAT), wherein the ERAT references the TLB to derive a real address for an effective address used by the first instruction from the test program.

5. The computer-implemented method of claim 4, further comprising:

configuring the computer simulation to run in a static TLB/ERAT mode before loading the TLB interrupt handler into the test generator, wherein contents of the TLB and said at least one BRAT remain fixed while executing the test program.

6. The computer-implemented method of claim 1, further comprising:

predicting results for executing each and every instruction from the test program;

executing all other instructions from the test program;

storing actual simulation results from executing each and every instruction from the test program; and summarizing a comparison of all, predicted results with all actual simulation results for each and every instruction from the test program.

7. The computer-implemented method of claim 1, wherein the computer simulation is for a Network On a Chip (NOC), wherein the NOC comprises a. plurality of processor units that communicate via data packets, and wherein the TLB is within a core of one of the plurality of processor units.

8. The computer-implemented method of claim 1, wherein the specific hardware system is a general purpose computer, and wherein the general purpose computer comprises a system bus, a video display, and a switch that is initially open between the system bus to the video display, the computer-implemented method further comprising:

in response to the general purpose computer initiating execution of the steps described in claim 1, closing the switch to couple the system bus to the video display, wherein closing the switch causes a transformation of the general purpose computer from a first device in which pending steps described in claim 1 are not displayed into a second device in which the pending steps described in claim 1 are displayed.

9. A computer system comprising:

a system bus;

a processor coupled to the system bus;

a memory coupled to the system bus, wherein the memory stores computer executable instructions that, when executed, perform a software table walk during test verification in a computer simulation by performing the steps of:

loading a Translation Lookaside Buffer (TLB) interrupt handler into a test generator, wherein the test generator randomly generates instructions for a test program to be virtually executed within a computer simulation;

populating the computer simulation with at least one Translation Lookaside Buffer (TLB), wherein the TLB contains a sub-set of entries from a page table, wherein entries from the page table map a virtual address to a real address in the computer simulation, and wherein the virtual address is for data used by an instruction from the test program;

utilizing the test generator to generate the test program;

stripping said at least one TLB from the computer simulation;

executing a first instruction from the test program in the computer simulation;

in response to the test program detecting a TLB miss of a needed virtual page that is required to execute the first instruction, utilizing the TLB interrupt handler to walk the page table until the needed, virtual page is located;

writing the needed virtual page to the TLB; and completing execution of the first instruction by using the needed virtual page from the TLB.

10. The system of claim 9, wherein the computer executable instructions are further configured for:

enabling Instruction-By-Instruction (IBI) checking before executing the first instruction from the test program, wherein the IBI checking checks for any error immediately after an instruction is executed in the computer simulation; and in response to the test program detecting the TLB miss, disabling the IBI checking before walking the page table.

11. The system of claim 9, wherein the computer executable instructions are further configured for:

executing a comparison instruction in the computer simulation to compare an actual simulation result from executing the first instruction to a predicted result from executing the first instruction.

12. The system of claim 9, wherein the computer executable instructions are further configured for:

repopulating the computer simulation with the TLB; and populating the computer simulation with at least one Effective to Real Address Table (ERAT), wherein the ERAT references the TLB to derive a real address for an effective address used by the first instruction from the test program.

13. The system of claim 9, wherein another virtual address in the TLB is for the first instruction from the test program.

14. The system of claim 9, wherein the computer executable instructions are further configured for:

predicting results for executing each and every instruction from the test program;

executing all other instructions from the test program;

storing actual simulation results from executing each and every instruction from the test program; and summarizing a comparison of all predicted results with all actual simulation results for each and every instruction from the test program.

15. A non-transitory computer-readable storage medium on which is encoded a computer program, the computer program comprising computer executable instructions configured for performing a software table walk during test verification in a computer simulation by performing the steps of:

loading a Translation Lookaside Buffer (TLB) interrupt handler into a test generator, wherein the test generator randomly generates instructions for a test program to be virtually executed within a computer simulation;

populating the computer simulation with at least one Translation Lookaside Buffer (TLB), wherein the TLB contains a sub-set of entries from a page table, wherein entries from the page table map a virtual address to a real address in the computer simulation, and wherein the virtual address is for data used by an instruction from the test program;

utilizing the test generator to generate the test program;

stripping said at least one TLB from the computer simulation;

executing a first instruction from the test program in the computer simulation;

in response to the test program detecting a TLB miss of a needed virtual page that is required to execute the first instruction, utilizing the TLB interrupt handler to walk the page table until the needed virtual page is located;

writing the needed virtual page to the TLB; and completing execution of the first instruction by using the needed virtual page from the TLB.

16. The non-transitory computer-readable storage medium of claim 15, wherein the computer executable instructions are further configured for:

enabling Instruction-By-Instruction (IBI) checking before executing the first instruction from the test program, wherein the IBI checking checks for any error immediately after an instruction is executed in the computer simulation; and in response to the test program detecting the TLB miss, disabling the IBI checking before walking the page table.

17. The non-transitory computer-readable storage medium of claim 15, wherein the computer executable instructions are further configured for:

executing a comparison instruction in the computer simulation to compare an actual simulation result from executing the first instruction to a predicted result from executing the first instruction.

18. The non-transitory computer-readable storage medium of claim 15, wherein the computer executable instructions are further configured for:

repopulating the computer simulation with the TLB; and populating the computer simulation with at least one Effective to Real Address Table (ERAT), wherein the ERAT references the TLB to derive a real address for an effective address used by the first instruction from the test program.

19. The non-transitory computer-readable storage medium of claim 15, wherein the computer executable instructions are further configured for:

predicting results for executing each and every instruction from the test program;

executing all other instructions from the test program;

storing actual simulation results from executing each and every instruction from the test program; and summarizing a comparison of all predicted results with all actual simulation results for each and every instruction from the test program.

20. The non-transitory computer-readable storage medium of claim 15, wherein the computer simulation is for a Network On a Chip (NOC), wherein the NOC comprises a plurality of processor units that communicate via data packets, and wherein the TLB is within a core of one of the plurality of processor units.

* * * * *